US006937927B2

(12) United States Patent
Wampler, II et al.

(10) Patent No.: US 6,937,927 B2
(45) Date of Patent: Aug. 30, 2005

(54) METHOD AND APPARATUS FOR HUMAN VEHICLE INTERFACE

(75) Inventors: Charles W. Wampler, II, Birmingham, MI (US); David R. Warn, Royal Oak, MI (US); Donn W. Glander, Grosse Pointe Woods, MI (US); Donald J. McMillan, Troy, MI (US)

(73) Assignee: General Motors Corporation, Detroit, MI (US)

( * ) Notice: Subject to any disclaimer, the term of this patent is extended or adjusted under 35 U.S.C. 154(b) by 379 days.

(21) Appl. No.: 10/304,087

(22) Filed: Nov. 25, 2002

(65) Prior Publication Data

US 2004/0102881 A1 May 27, 2004

(51) Int. Cl.[7] .............................. G06F 19/00; G06F 7/00
(52) U.S. Cl. ................. 701/36; 318/568.12; 318/568.1; 180/315
(58) Field of Search ................ 701/36, 49; 318/568.12, 318/568.1; 180/315

(56) References Cited

U.S. PATENT DOCUMENTS

| | | | |
|---|---|---|---|
| 5,952,806 A | * | 9/1999 | Muramatsu ............ 318/568.12 |
| 6,154,201 A | | 11/2000 | Levin et al. ................. 345/184 |
| 2004/0050612 A1 | * | 3/2004 | Katae et al. ................. 180/315 |

FOREIGN PATENT DOCUMENTS

WO    WO 99/49443    9/1999

OTHER PUBLICATIONS

Brochure entitled "iDrive, the Human Machien Interface Concept of BMW", Convergence 2000, Detroit, Michigan, Oct. 2000.
Brochure entitled iDrive, Detroit International Auto Show, Detroit, Michigan, Jan. 2001.
Article from Auto Motor Sport Magazine, pae 17, issue 14, Jun. 2001.

* cited by examiner

*Primary Examiner*—Thomas G. Black
*Assistant Examiner*—Ronnie Mancho
(74) *Attorney, Agent, or Firm*—Kathryn A. Marra

(57) ABSTRACT

A human vehicle interface for vehicle secondary controls includes a housing, an actuator grounded to the housing and having at least one degree of freedom, a follower coupled to the actuator and having a degree of freedom in the z direction, and a reaction plate having a first spatial relationship with the follower and defining a position path for the follower, wherein the actuator is responsive to the reaction plate at the first spatial relationship. The actuator includes a body and a control knob.

23 Claims, 4 Drawing Sheets

METHOD AND APPARATUS FOR HUMAN VEHICLE INTERFACE

BACKGROUND OF THE INVENTION

This invention relates generally to a human vehicle interface, and more particularly to a method and apparatus for a human interface to vehicle secondary controls.

Conventional automobiles are equipped with a moderate number of secondary (non-driving) control systems, such as audio and heating-ventilation-air-conditioning (HVAC) systems, for example. The human-vehicle controls for these systems typically use dedicated buttons or knobs for each secondary function in a vicinity close to the driver, herein referred to as "prime real estate." A one-to-one relationship between control system functions and human-vehicle control instruments (knobs, sliders, buttons, etc.) is advantageous in that the force characteristic (detents, stops, frictional resistance, for example) of each instrument can be tailored for an appropriate ease-of-use for the associated function. However, as the number of secondary control systems increases to include such additional systems as telephonic and navigational systems, for example, the prime real estate quickly becomes congested or more broadly distributed, and eventually there is no room left for additional control instruments. Also, the presence of more and more control buttons and knobs creates a visually complex interface, which may be counter to the aesthetic appearance of the vehicle. As an alternative, a trend is developing that utilizes control buttons and knobs that have more than one control capability, such as an audio volume control button having a push-in characteristic to control the left-right speaker volume balance, for example. Further improvements in the area of human-vehicle interface will enable more control systems to be controlled by fewer control buttons.

BRIEF DESCRIPTION OF THE INVENTION

In one embodiment, a human vehicle interface for vehicle secondary controls includes a housing, an actuator grounded to the housing and having at least one degree of freedom, a follower coupled to the actuator and having a degree of freedom in the z direction, and a reaction plate having a first spatial relationship with the follower and defining a position path for the follower, wherein the actuator is responsive to the reaction plate at the first spatial relationship. The actuator has a body and a control knob.

In another embodiment, a method for interfacing with vehicle secondary controls includes actuating an actuator having x, y, z, and z-rotational degrees of freedom and capable of moving a follower along a path on a reaction plate, determining the x and y positions of the follower on the reaction plate, identifying a control zone for controlling a vehicle secondary control system in response to the x and y positions of the follower on the reaction plate, registering a vehicle secondary control system with the identified control zone, and controlling the registered vehicle secondary control system.

In a further embodiment, a method for interfacing with vehicle secondary controls includes selecting one of at least two operating modes for operating a human vehicle interface, actuating an actuator having x, y, z, and z-rotational degrees of freedom, determining the x and y positions of the actuator, and providing a control output in response to the x and y positions of the actuator and in response to the operating mode selected.

BRIEF DESCRIPTION OF THE DRAWINGS

Referring now to the figures, which are exemplary embodiments, and wherein like elements are numbered alike.

DETAILED DESCRIPTION OF THE INVENTION

A detailed description of an embodiment of the present invention is presented herein by way of exemplification and not limitation with reference to FIGS. 1–6.

Figure 1:
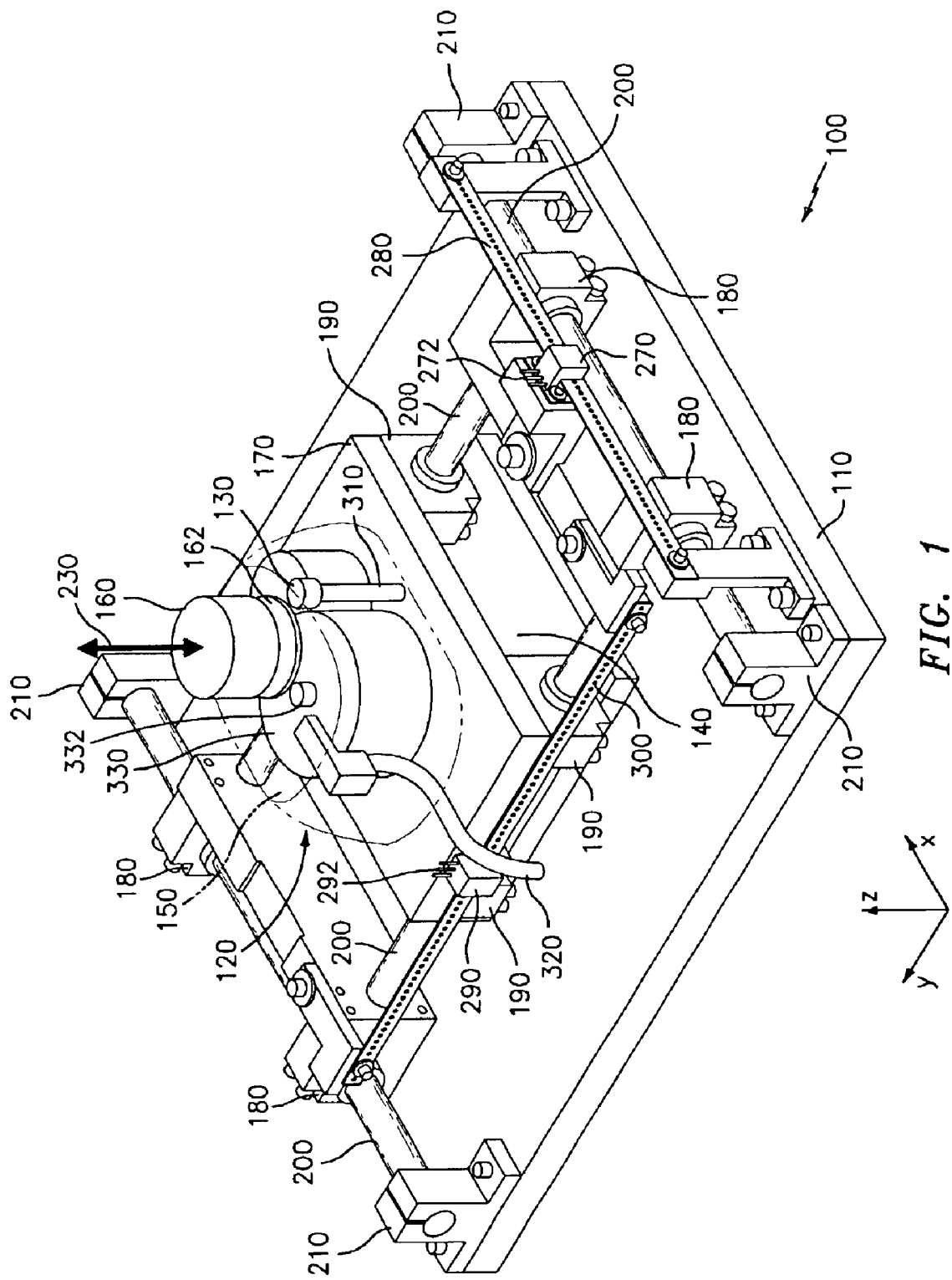
FIG. 1 depicts a perspective view of a human vehicle interface in accordance with an embodiment of the present invention.
Figure 2:
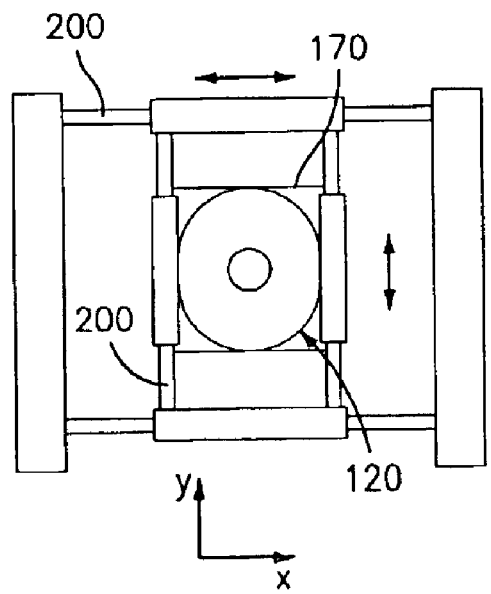
FIG. 2 depicts an orthogonal top view of the human vehicle interface of FIG. 1.

Referring to FIG. 1, a human vehicle interface 100 for vehicle secondary controls, such as audio, climate, telephone, and navigation, for example, is shown to include a housing 110, an actuator 120 grounded to housing 110 and having translational degrees of freedom in the x, y, and z directions and a rotational degree of freedom about the z-axis, a follower 130 coupled to actuator 120 having a translational degree of freedom in the z direction, and a reaction plate 140 adapted to have a first and a second spatial relationship with follower 130 and structured to define a position path for follower 130. Actuator 120 includes a body 150 and a control knob 160 and is responsive to reaction plate 140 when reaction plate 140 and follower 130 are in the first spatial relationship.

The base 170 of body 150 is grounded to housing 110 by x linear bearings 180, y linear bearings 190, bearing rods 200, and bearing supports 210. Bearing supports 210 are attached to housing 110. Actuator 120 is capable of translating in the x and y directions relative to reaction plate 140 by way of x and y linear bearings 180, 190 sliding on bearing rods 200. As best seen by now referring to FIGS. 2 and 3, control knob 160 is capable of rotating about the z-axis, depicted by 220, and translating in the z-direction, depicted by 230. Follower 130 is coupled to actuator 120 within follower housing 240 and is biased in the negative-z direction by bias spring 250. In the alternative, follower 130, follower housing 240, and bias spring 250, are referred to as providing a spring-biased plunger arrangement. The capped end 132 of follower 130 provides a spring surface 131 for interacting with bias spring 250 and an engagement rim 134 for engaging with engagement rib 242 of follower housing 240. The rounded end 136 of follower 130 is biased against reaction plate 140, and more specifically is biased against the topographical surface 142 of reaction plate 140. When follower 130 is biased against reaction plate 140, they are referred to as being in a first spatial relationship (also herein referred to as operating in the first mode). Alternatively, follower 130 and reaction plate 140 may be arranged so that they are not in contact with each other, in which case they are referred to as being in a second spatial relationship (also herein referred to as operating in the second mode). The second spatial relationship (non-contact) may be achieved by follower 130 being retracted into follower housing 240 by a solenoid (not shown), for example, or by reaction plate 140 being displaced away from follower 130 by a linear driver (not shown), for example. When reaction plate 140 and follower 130 are in the second spatial relationship, actuator 120 is not responsive to topographical surface 142 of reaction plate 140. Topographical surface 142 includes ramps (topographical inclines) 144, detents (topographical detents) 146, and grooves (straight or curved topographical paths) 148, which are best seen by now referring to FIG. 4.

Figure 3:
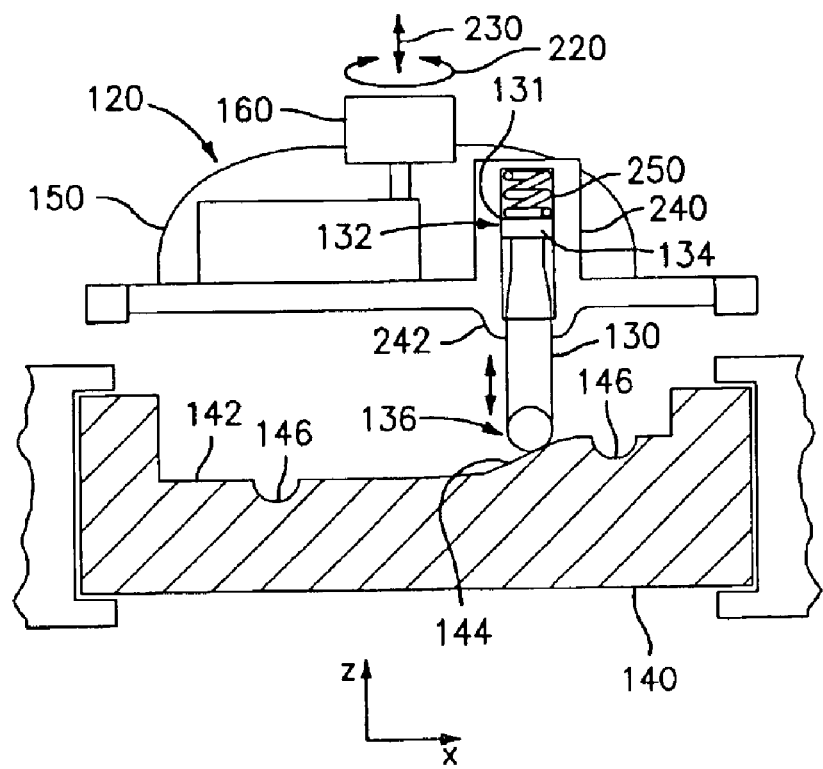
FIG. 3 depicts an orthogonal side view of the human vehicle interface of FIG. 1.
Figure 4:
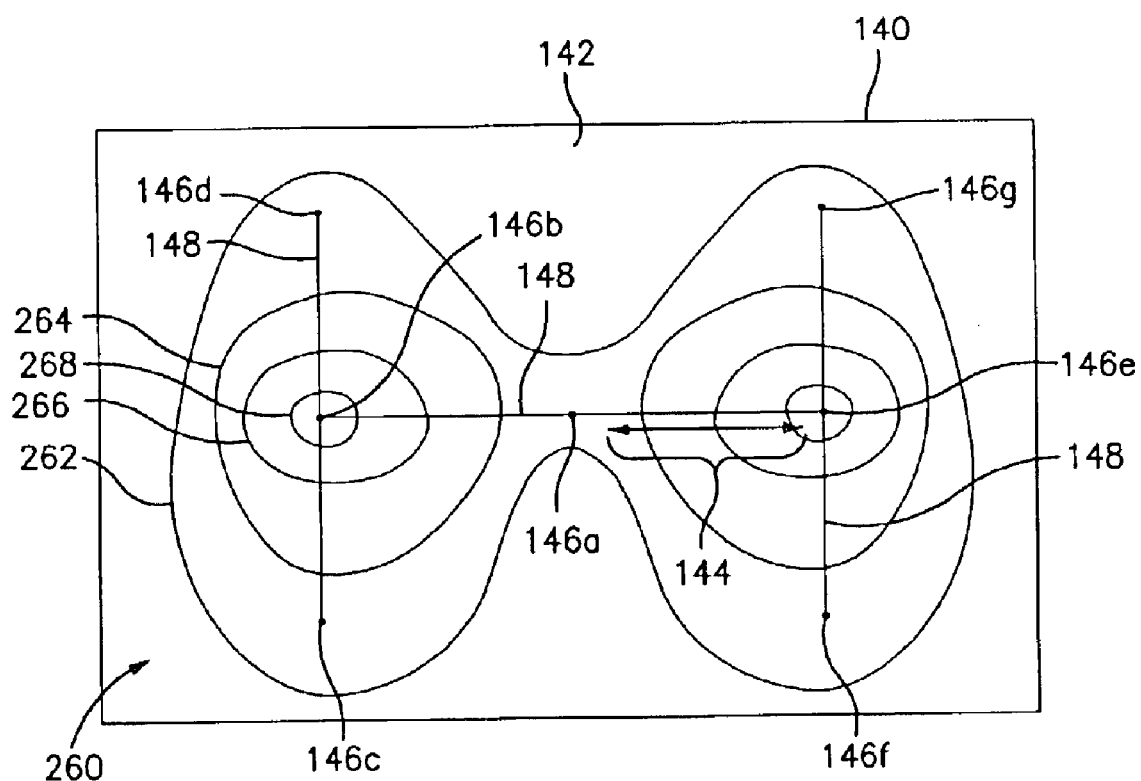
FIG. 4 depicts a plan view of a topographical surface of a reaction plate for use in an embodiment of the present invention.

FIG. 4 depicts grooves 148 in an "H" pattern, however, alternative patterns may be employed, such as, for example, an "E" pattern, a "U" pattern, a star "*" ("Star") pattern, or any other pattern that would be suitable for implementing the teaching of the present invention. It will be appreciated that different vehicles with different vehicle secondary controls can employ the teachings of the present invention by using the described human vehicle interface 100 but with different reaction plates 140 having different "H" or "E" patterns, for example. Thus, another feature of the present invention is the ability to detach reaction plate 140 from housing 110 and to replace it with a different reaction plate 140, depending on the desired set of vehicle secondary controls to be employed. Reaction plate 140 may be detachably arranged on housing 110 using a bolted arrangement or a snap-fit arrangement, both of which are known attachment means. Grooves 148 define a path on reaction plate 140 that is engaged by rounded end 136 of follower 130 acting under the influence of bias spring 250. As an operator moves actuator 120, with follower 130 and reaction plate 140 in a first spatial relationship, rounded end 136 of follower 130 travels along the predefined path of the "H" pattern created by grooves 148. Since the "H" pattern on reaction plate 140 defines a path for the position of follower 130 as actuator 120 is moved, reaction plate 140 is referred to as defining a position path for follower 130. At various points on the "H" pattern there are detents 146, depicted as 146*a–g*, in which rounded end 136 of follower 130 rests when actuator 120 is not being moved by a user. Detents 146*c, d, f,* and *g,* are depicted at the endpoints of the legs of the "H" pattern, but may also be intermediate positions where multiple "H" and "E" patterns are combined together, for example. The contour lines 260 on reaction plate 140 define points on a topographical line that are at a common elevation. As follower 130 travels from detent 146*a* to detent 146*b*, it is traveling from an elevation defined by contour line 262 up to an elevation defined by contour line 268, which results in bias spring 250 being compressed in follower housing 240. The change in elevation is also depicted in FIG. 3 as ramp 144. In the reverse direction, from detent 146*b* to detent 146*a,* follower 130 is traveling down an incline, and is under the action of both a user and the bias spring 250. It will be appreciated that a bias spring force in the z-direction will result in a force component in the x-direction when follower 130 is on an incline (ramp 144). To facilitate motion to a desired detent 146, bias spring 250 and contour lines 260 are structured such that follower 130 will move under the influence of bias spring 250 alone when rounded end 136 is moved out of a detent 146 by a user and placed in a region where the contour lines 260 fall off. In this manner, the "H" pattern on reaction plate 140 is considered not only to define a position path for follower 130 but also a motion path. The position and motion paths defined by reaction plate 140 are also referred to as topographical paths. Depending on the desired feel (tactile feedback to a user) of actuator 120, bias spring 250 and contour lines 260 can be designed to produce an x-force component when follower 130 travels from detent 146*b* to detent 146*a* that is the same as or different than the y-force component when traveling from detent 146*b* to detent 146*d*. It will be appreciated that a large number of options are available depending on the desired tactile feedback to the user, and the present invention is not limited to the embodiment described. Preferably, one detent is used as a home position for actuator 120. In the embodiment of FIG. 4, detent 146*a* is depicted as the home position, meaning that follower 130 is biased to move to detent 146*a* when it is positioned between detents 146*a* and *b,* or 146*a* and *e*.

Referring now back to FIG. 1, human vehicle interface 100 also includes an x-encoder 270, an x-linear encoder strip 280, a y-encoder 290, a y-linear encoder strip 300, and a z-position sensor 310. The x-encoder pins 272 on x-encoder 270, and the y-encoder pins 292 on y-encoder 270, are in signal communication with a vehicle computer (not shown) to provide x, y and z positional information about actuator 120. While the signal communication arrangement is herein depicted by physical connections, such as wires, strips or the like, it is also appreciated that wireless communication may also be employed using known wireless communication technology. As actuator 120 is moved in the x, y plane by way of linear bearings 180, 190 sliding on bearing rods 200, x and y encoders 270, 290 slide on x and y linear encoder strips 280, 300, respectively. The amount of linear encoder strip between the respective encoder and an endpoint of the respective linear encoder strip can be measured by known means, such as by optically detecting lines marked on the strip and using an up/down counter with quadrature to digitally track the x, y position of actuator 120. (A two-channel optical encoder, such as the HEDS-9700 series from Agilent Technologies, or any similar device.) Other known means, such as determining the amount of electrical resistance present between the respective encoder and an endpoint of the respective encoder strip, for example, could be used to establish the x, y position of actuator 120. Microswitches (not shown) in actuator 120 detect the push/pull/neutral position of the z-translation, depicted by 230, of the control knob 160, and a rotary optical encoder (not shown) measures the z-rotation, depicted by 220, of control knob 160. Signal communication from the push/pull microswitches, the z-rotation rotary optical encoder and the y-encoder 290 (via y-encoder pins 292)to the vehicle computer (not shown) is achieved by a communication link carried in cable 320. Thus, motion of actuator 120 results in motion of follower 130, which results in x and y position signals being sent to the vehicle computer thereby enabling the vehicle computer to register the x, y position of follower 130 with a memory map internal to the computer. When follower 130 is at an x, y position defined by one of the topographical detents 146*a–g,* follower 130 is referred to as being within a control zone, which itself defines a particular vehicle secondary control system to be controlled, such as, for example, an audio system, a heating-ventilation-air-conditioning (HVAC) system, a telephone, a driver information system, or a navigational system.

The location of actuator 120 within a particular control zone (depicted in FIG. 4 as detents 146*a–g*) not only determines which vehicle secondary control system is to be operated, but also determines what the tactile feedback to control knob 160 should be as it is rotated. For example, if the control zone depicted by detent 146*c* is for volume control of an audio system, the vehicle computer will register the x, y follower location and push/pull control knob status with the internal memory map and set up appropriate control parameters for that control zone, which include torque feedback parameters to the motor 330 that is coupled to control knob 160 for producing a tactile torque feedback to the operator. Motor 330 may also include a gear assembly consisting of a pinion gear 332 on (not shown) motor 330 that engages a drive gear 162 on control knob 160 to increase torque output. Torque feedback parameters are used to compute a desired torque response to the measured z-rotations of control knob 160, and appropriate electrical power is transmitted via cable 320 to motor 330 to produce that the feedback torque in the control knob 160. For volume control, the torque feedback parameters from the vehicle computer to motor 330 may produce in control knob 160 a low degree of resistance to turning and a fine step (such as in a stepping motor) resolution in the incremental amount of turning, thereby providing the operator with tactile feedback at control knob 160 that is specific to volume control of an audio system. Alternatively, and for a different control zone, if control zone depicted by detent 146*d* is for fan speed control of an HVAC system, the torque feedback parameters from the vehicle computer to motor 330 may produce in control knob 160 a high degree of resistance to turning and a course step resolution in the incremental amount of turning, thereby providing the operator with tactile feedback at control knob 160 that is specific to fan speed control of an HVAC system. It will be appreciated that a variety of tactile feedback parameters may be used depending on the vehicle secondary control system to be controlled and that the present invention is not limited to any specific example described herein. As discussed above and depicted by numeral 230 in FIG. 3, control knob 160 is capable of up-and-down (alternatively, push-pull) translation in the z-direction, which may be used for a variety of functions, such as, tone control or volume balance in an audio system, for example. In providing tactile feedback, control knob 160 is referred to as a haptic push-pull rotary control knob. A suitable example of control knob 160 integrated with motor 330, gear assembly 162, 332, push sensor (not shown), and z-rotation encoder (not shown) is the programmable rotating actuator manufactured by Mannesmann VDO, which also includes an external microprocessor controller for computing torque feedback and a motor drive circuit for sending the appropriate electrical power to the motor.

As discussed above, when reaction plate 140 and follower 130 are in the second spatial relationship, actuator 120 is not responsive to topographical surface 142 of reaction plate 140. Under these circumstances, actuator 120 can perform an alternate function, such as the function of the well-known computer mouse (or more generically, computer pointing device), and the vehicle computer can be programmed to recognize the movements of actuator 120 as being synonymous with the movement of a computer mouse. Acting as a computer mouse, control knob 160 of actuator 120, having push-pull characteristics, can perform the "mouse-click" function of a mouse button. For example, when the vehicle employing the human vehicle interface 100 of the present invention is operating in the second mode, the vehicle computer is signaled to recognize actuator 120 as a mouse and the unencumbered x, y motion of actuator 120 is used to positionally control the location of a cursor (pointer) on a computer screen. Selection of a menu option on the computer screen can be achieved by the "mouse-click" function of control knob 160, as discussed above, and the action of scrolling through a list of menu options on the computer screen can be achieved by rotating control knob 160 in a first or second direction. In this manner, on-board navigational aids can be graphically controlled, and on-board user manuals can be graphically accessed. A dashboard hookup, such as a USB (universal serial bus) connector, or a wireless connection could provide the user with the option of controlling a laptop computer via the human vehicle interface 100. Human vehicle interface 100 is preferably located in an area accessible to both driver and passenger, such as in the center console area, for example.

Figure 5:
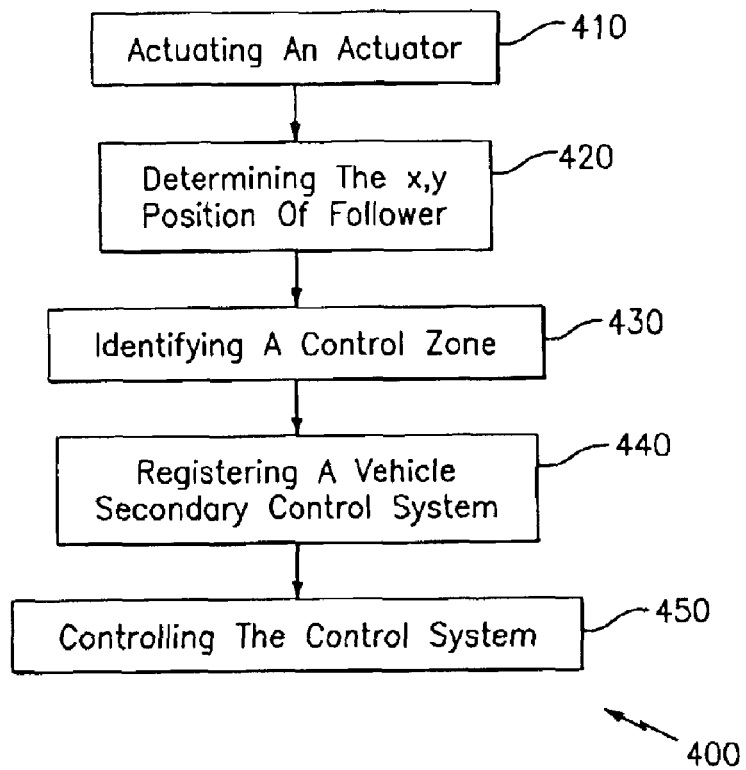
FIGS. 5–6 depict processes for implementing alternative embodiments of the present invention.

By referring now to FIG. 5, a process 400 for interfacing with vehicle secondary controls is shown. At step 410, actuator 120 having x, y, z, and z-rotational degrees of freedom is actuated, and as discussed above, actuator 120 is adapted to move follower 130 along a path, such as the "H" pattern depicted in FIG. 4, on reaction plate 140. At step 420, the x and y positions of follower 130 on reaction plate 140 are determined using x and y encoders 270, 290 and x and y linear encoder strips 280, 300. At step 430, a control zone for controlling a vehicle secondary control system is identified by a vehicle computer (not shown) responding to the x and y positions of follower 130 on reaction plate 140. At step 440, the vehicle computer registers a vehicle secondary control system with the identified control zone by accessing an on-board memory map. And, at step 450, human vehicle interface 100 provides the operator with control of the vehicle secondary control system registered by the vehicle computer.

Step 410 may include the actuation of actuator 120 having tactile feedback responsive to the position of follower 130 on reaction plate 140, as discussed above. Step 420 may include the determination of the x and y positions of follower 130 in response to linear encoder strips 280, 300 and encoder signals determined therefrom, as discussed above. And, process 400 may further include the providing of tactile feedback to actuator 120 in response to the registered vehicle secondary control system, as discussed above.

Figure 6:
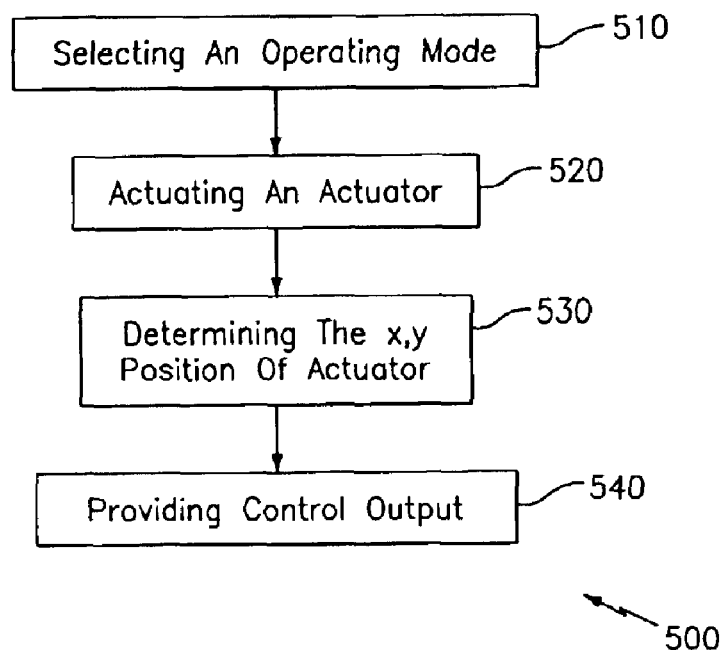

By referring now to FIG. 6, another process 500 for interfacing with vehicle secondary controls is shown. At step 510, one of at least two operating modes for operating human vehicle interface 100 is selected, which as discussed above, may be a secondary vehicle control operating mode or a computer mouse operating mode. At step 520, an operator actuates actuator 120 having x, y, z, and z-rotational degrees of freedom. At step 530, the x and y positions of actuator 120 are determined using x and y encoders 270, 290 and x and y linear encoder strips 280, 300. And, at step 540, a vehicle computer (not shown) provides a control output in response to the x and y positions of actuator 120 and in response to the operating mode selected. As discussed above, the selection of an operating mode is related to the spatial relationship of follower 130 and reaction plate 140, and therefore, process 500 may include the positioning of follower 130 and reaction plate 140 in one of two spatial relationships, the second which may be achieved by follower 130 being retracted into follower housing 240 by a solenoid (not shown), for example, or by reaction plate 140 being displaced away from follower 130 by a linear driver (not shown), for example.

An advantage of the present invention includes a computer-controlled force-feedback control knob having specific force profiles for specific control systems, thereby providing a single haptic knob with multi-functional capability that associates a location in space with a particular function while occupying less space than would be required by multiple control knobs.

While the invention has been described with reference to an exemplary embodiment, it will be understood by those skilled in the art that various changes may be made and equivalents may be substituted for elements thereof without departing from the scope of the invention. In addition, many modifications maybe made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A human vehicle interface for vehicle secondary controls, comprising:
   a housing;
   an actuator grounded to said housing and having at least one degree of freedom, said actuator having a body and a control knob;
   a follower coupled to said actuator and having a degree of freedom in the z direction; and
   a reaction plate having a first spatial relationship with said follower and defining at least one of a position path or a motion path for said follower; wherein
   said actuator is responsive to said reaction plate at said first spatial relationship.

2. The human vehicle interface of claim 1, wherein:
   said reaction plate and said follower have a second spatial relationship; and
   said actuator is not responsive to said reaction plate at said second spatial relationship.

3. The human vehicle interface of claim 2, wherein:
   said actuator is a computer mouse for communicating with a vehicle computer in response to said reaction plate and said follower being at said second spatial relationship.

4. The human vehicle interface of claim 1, wherein:
   said reaction plate is detachably disposed within said housing.

5. The human vehicle interface of claim 1, wherein:
   said at least one degree of freedom comprises at least one of: translation in the x direction, translation in the y direction, translation in the z direction, or rotation about the z axis.

6. The human vehicle interface of claim 5, wherein:
   said control knob of said actuator comprises a haptic push-pull rotary knob.

7. The human vehicle interface of claim 6, further comprising:
   x and y position encoders for defining the x and y positions of said actuator.

8. The human vehicle interface of claim 7, further comprising:
   a topographical detent on said reaction plate for defining a control zone for controlling a vehicle secondary control system; and
   a motor responsive to a vehicle computer and to the x and y positions of said actuator for modifying the tactile feedback of said haptic push-pull rotary knob in response to the vehicle secondary control system under control.

9. The human vehicle interface of claim 1, wherein:
   said follower comprises a spring-biased plunger being biased against said reaction plate.

10. The human vehicle interface of claim 1, wherein:
    said reaction plate further comprises at least one topographical detent for defining at least one control zone.

11. The human vehicle interface of claim 10, wherein:
    said at least one control zone controls at least one of: an audio system, a HVAC system, a telephone, a driver information system, or a navigational system.

12. The human vehicle interface of claim 10, wherein:
    said position path has at least one of: an "H" shape, an "E" shape, a "U" shape, or a "Star" shape; and
said at least one topographical detent is at an endpoint of said position path.

13. The human vehicle interface of claim 10, wherein:
    said motion path biases said actuator to said at least one topographical detent.

14. The human vehicle interface of claim 1, wherein:
    said at least one of a position path or a motion path comprises at least one of a straight line groove or a curved line groove in at least one of an x, y or z direction.

15. The human vehicle interface of claim 1, wherein:
    said position path defines a home position for said actuator and said motion path biases said actuator to said home position.

16. The human vehicle interface of claim 1, wherein:
    said actuator is grounded to said housing by linear bearings.

17. A method for interfacing with vehicle secondary controls, comprising:
    actuating an actuator having x, y, z, and z-rotational degrees of freedom and capable of moving a follower along a path on a reaction plate;
    determining the x and y positions of the follower on the reaction plate;
    identifying a control zone for controlling a vehicle secondary control system in response to the x and y positions of the follower on the reaction plate;
    registering a vehicle secondary control system with the identified control zone; and
    controlling the registered vehicle secondary control system.

18. The method of claim 17, wherein said actuating an actuator further comprises:
    actuating an actuator having tactile feedback responsive to the position of the follower on the reaction plate.

19. The method of claim 17, wherein said determining the x and y positions of the follower further comprises:
    determining the x and y positions of the follower in response to linear encoder strips and encoder signals determined therefrom.

20. The method of claim 17, further comprising:
    providing tactile feedback to the actuator in response to the registered vehicle secondary control system.

21. A method for interfacing with vehicle secondary controls, comprising:
    selecting one of at least two operating modes for operating a human vehicle interface;
    actuating an actuator having x, y, z, and z-rotational degrees of freedom;
    determining the x and y positions of the actuator; and
    providing a control output in response to the x and y positions of the actuator and in response to the operating mode selected.

22. The method of claim 21, wherein said selecting one of at least two operating modes further comprises:
    selecting at least one of a secondary vehicle control operating mode or a computer mouse operating mode.

23. The method of claim 21, further comprises:
    positioning a follower and a reaction plate in one of at least two spatial relationships.

* * * * *